No. 832,817. PATENTED OCT. 9, 1906.
M. B. SHERMAN.
PROCESS FOR TREATING RASPBERRIES.
APPLICATION FILED MAY 29, 1906.

Marinus B. Sherman,
INVENTOR.

WITNESSES:

By C.A. Snow & Co
ATTORNEYS

UNITED STATES PATENT OFFICE.

MARINUS B. SHERMAN, OF PAYETTE, IDAHO.

PROCESS FOR TREATING RASPBERRIES.

No. 832,817.     Specification of Letters Patent.     Patented Oct. 9, 1906.

Application filed May 29, 1906. Serial No. 319,347.

*To all whom it may concern:*

Be it known that I, MARINUS B. SHERMAN, a citizen of the United States, residing at Payette, in the county of Canyon and State of Idaho, have invented a new and useful Process for Treating Raspberries, of which the following is a specification.

This invention has relation to processes for treating raspberries; and it consists in the novel construction and arrangement of its parts, as hereinafter described.

The object of this invention is to provide a process and apparatus, as above indicated, for treating raspberries, so that berries which are now permitted to go to waste may be converted into such condition as to be salable upon the market.

To appreciate the extent, scope, and importance of this invention, a brief statement of conditions is given as follows: In arid sections of the country where there is little rain during the ripening period of raspberries the berries do not drop from the vine when ripe, as they do in sections where the climate has plenty of rain. In the arid sections the berries remain on the vine and become dry, in which condition the quality of the fruit is good, but has heretofore been considered worthless for various reasons, the first of which was the impracticability of gathering the fruit in this condition; second, when removed from the vine a thorny stem adhered to the berry; third, the berry had a peculiar whitish mildewed appearance which rendered it unsalable.

The present invention has for its object the process and apparatus for threshing the dried berries from the vines, removing the thorny stem, and removing the whitish appearance, so as to produce a superior article at a cost much below the cost of producing dried raspberries by ordinary methods.

Figure 1:
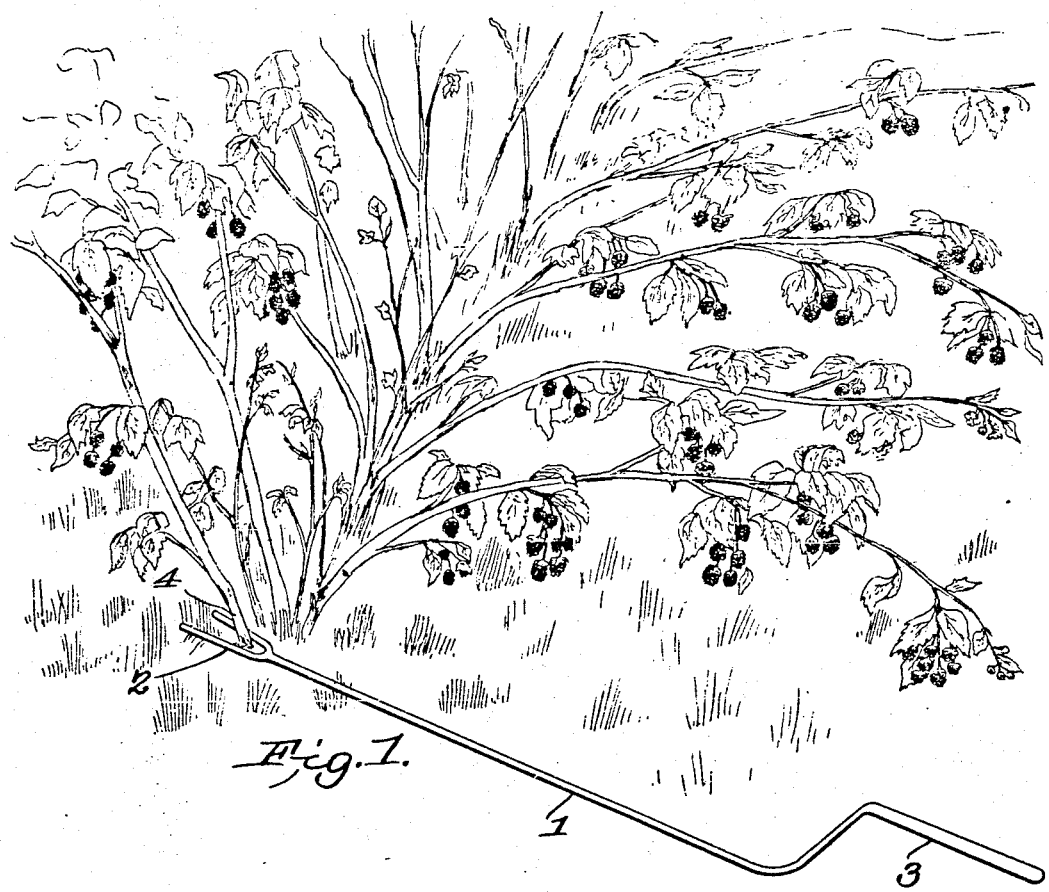
Figure 2:
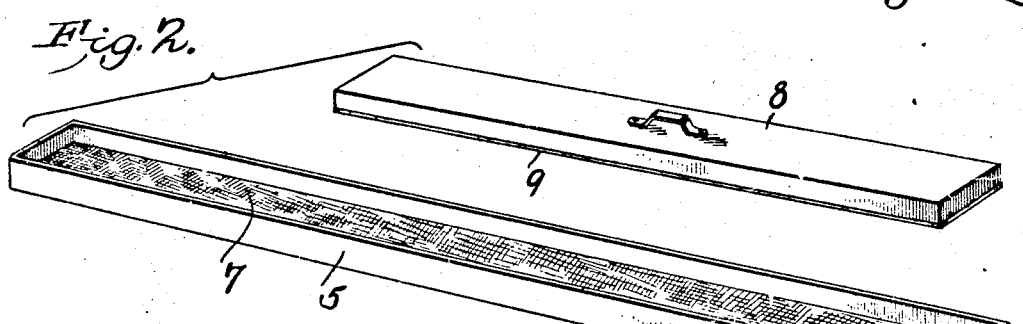
Figure 3:
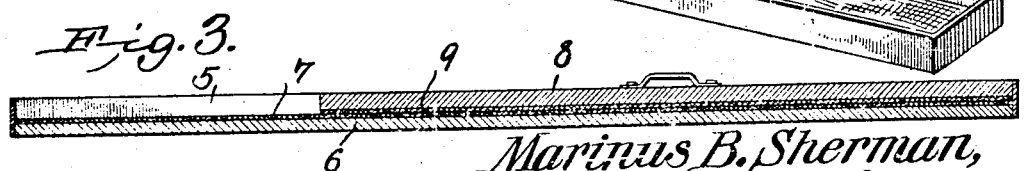

In the accompanying drawings, Figure 1 is a perspective view of a fork adapted to be used for turning down vines. Fig. 2 is a perspective view of a device for removing the thorny stems from the berries, and Fig. 3 is a longitudinal sectional view of the device shown in Fig. 2.

The process is as follows: The branches of the vines that are to bear fruit are arranged so that they will not become entangled with the oncoming growth. To accomplish this, the stems are crushed or partly broken near the ground, and the tops of the stems are bent over to the ground, where they will lie and continue to develop and ripen the fruit. A further object for breaking down the vines is that the free passage of the sap is interfered with, and consequently all of the fruit due to be borne by the plant is matured and ripened substantially at the same time. Thus the process of treating the fruit extends over the time that the fruit is in embryotic and matured state. The advantage of thus partially breaking the stems is that none of the fruit is wasted by reason of the fact that some of it would become ripened too far in advance of the harvesting time or that some of it would not ripen by the time that the vines are harvested. When the fruit is ripened and becomes dry, the stems bearing the fruit are removed and gathered in small piles to dry. The berries are then beaten from the vines with a flail. (Not shown.) The berries thus removed are fanned for the purpose of clearing them from leaves, sticks, and trash. To the berries thus treated there is attached a thorny stem. These stems are removed from the berries by means of the apparatus shown in Figs. 2 and 3 of the drawings and which will be explained hereinafter. After the thorny stems have been removed and the berries fanned and screened they are put through a dipping process to remove the whitish appearance and otherwise improve them. This process consists in dipping the berries in hot water, then placing them in a bin to sweat and soften. They are then placed in suitable drying-crates, and the moisture is reduced to the desired percentage, when the berries are ready for the market. In this manner wholesome material which has heretofore been permitted to go to waste is converted into an admirable food article and is in salable condition.

The device for bending the vines over consists of the rod 1, having the bifurcated end 2 and the crank-handle 3 at its other end. The bifurcations 2 are slipped about the base of the stem 4, and the rod is turned by means of the crank-handle 3, and thus it will be seen that the stem 4 will be bent down over one of the bifurcations 2, which operation partly crushes the said stem at its base, and the fracture makes it impossible for the said stem to again assume an erect position. Consequently it is out of the way of the oncoming growth of the vine, and the fruit advances to maturity, as above described.

The apparatus for removing the thorny stems from the berries consists of the box 5, which in practice is about fourteen feet long by twelve inches wide by three inches deep and without top. This box is slightly corrugated or roughened on the inner side of its bottom. The strip of canvas 7, laid upon the bottom 6, will answer the purpose. The block 8, adapted to accompany the said box, is about ten feet long by twelve inches wide, and its under surface is corrugated or roughened or provided with a strip of canvas 9. The berries having the stems are placed in the box 5, and the block with its toughened surface is placed upon the berries and reciprocated back and forth along the longitudinal axis of the box. The berries thus being rolled or milled between the roughened surface of the box-bottom and the rough surface of the block, the thorny stems are separated from the berries.

Having described my invention, what I claim as new, and desire to secure by Letters Patent, is—

A process for treating raspberries consisting in partially breaking the vine-stem bearing the berries, then cutting said stems after the berries have ripened, then drying the berries on the stems, then threshing the berries from the stems, then removing the thorny stems from the berries, then dipping the berries in hot water, then sweating the berries, then reducing the percentage of moisture of the berries.

In testimony that I claim the foregoing as my own I have hereto affixed my signature in the presence of two witnesses.

MARINUS B. SHERMAN.

Witnesses:
C. B. COXE,
INA I. BRYAN.